G. GRIESCHE & A. BECK.
GRANITE AND STONE SAW.
APPLICATION FILED DEC. 9, 1913.
1,113,780.    Patented Oct. 13, 1914.
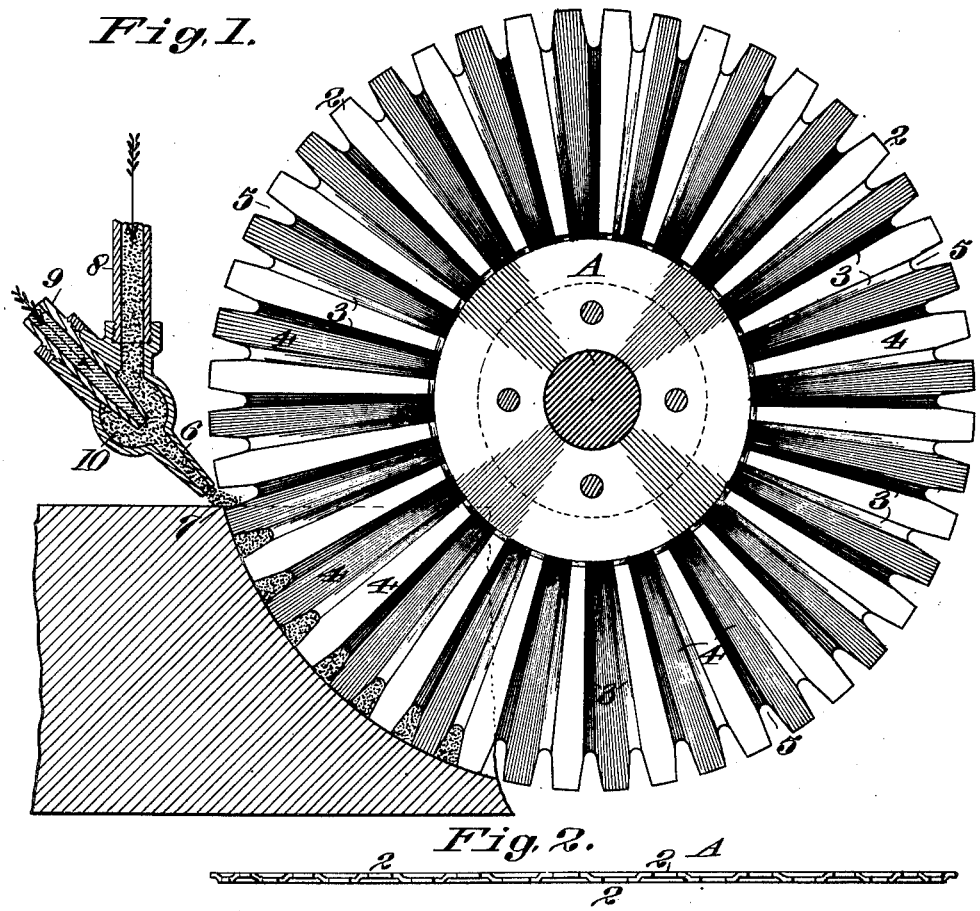
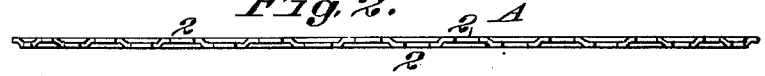
WITNESSES:
Charles Pickles
Thos Eastberg
INVENTORS,
Gustav Griesche,
Anthony Beck
BY G. H. Strong,
ATTORNEY

UNITED STATES PATENT OFFICE.

GUSTAV GRIESCHE AND ANTHONY BECK, OF OAKLAND, CALIFORNIA.

GRANITE AND STONE SAW.

1,113,780.  Specification of Letters Patent.  Patented Oct. 13, 1914.

Application filed December 9, 1913. Serial No. 805,498.

*To all whom it may concern:*

Be it known that we, GUSTAV GRIESCHE and ANTHONY BECK, citizens of the United States, residing at Oakland, in the county of Alameda and State of California, have invented new and useful Improvements in Granite and Stone Saws, of which the following is a specification.

Our invention relates to that class of apparatus in which granite, stone and like substances are cut by the abrasion of a saw of suitable character in conjunction with an abrasive substance interposed between the saw and the material to be cut.

Our invention consists in a novel construction of the saw and means to introduce and distribute the abrasive material between the saw teeth and the block to be cut.

Referring to the accompanying drawings for a more complete explanation of our invention Figure 1 is a side elevation of the saw and means for introducing an abrasive material into the working space. Fig. 2 is a sectional edge view of the saw. Fig. 3 is an enlarged detail section of the saw.

For the cutting of stone, granite, and like substances, it is customary to employ a reciprocating, or a rotary saw having a smooth edge, and to introduce between this edge and the line of cleavage of the block an abrasive substance, such as sharp sand or the like.

In our invention we have provided a means for more thoroughly introducing and distributing the abrasive material and insuring its more effective action in the cutting. In the present case we have shown the device as applied to a circular saw A, having teeth 2, and the sides of the saw are offset alternately in the plane of the teeth, as shown at 3, thus leaving a radial corrugation 4 at each side of the blade in line with each tooth. This construction, with the teeth and the alternate grooves 5, between the teeth, and the radial corrugations continuous with the bottom of said grooves insures a perfect distribution of the abrasive material which is introduced into the channel being cut as follows: 6 is a nozzle properly supported and directed to the point where the rotation of the saw brings the teeth into contact with the surface to be cut, as shown at 7. Connected with this nozzle is a supply pipe 8 through which coarse, sharp sand, shot, or other abrasive material may be introduced. 9 is a pipe entering the chamber 10, into which the abrasive material is received from the pipe 8, and this pipe terminates in a discharge nozzle in line with the interior of the nozzle 6. Through the pipe 9 hydraulic pressure may be brought to any desired degree, and the sand or abrasive material delivered through the nozzle 6 into the spaces between the teeth of the saw as they successively pass the nozzle and enter the channel in the block which is being cut. The abrasive material thus forced into the spaces between the teeth will also be perfectly distributed by reason of the offset corrugations 4 of the plate, and thus a very effective cutting apparatus is produced. It should be understood that while the teeth add to the rapidity of the abrasive action, the saw will be very effective if made without any teeth, as the radial grooves or channels serve to effectively direct and distribute the abrasive material.

Having thus described our invention, what we claim and desire to secure by Letters Patent is—

1. A stone and like sawing apparatus, comprising a circular revoluble disk having alternate teeth and radial depressions, a supply duct for abrasive material discharging contiguous to and in the plane of rotation of the disk, and a hydraulic pressure nozzle coacting with the supply duct to produce an action counter to the centrifugal action so as to maintain the abrasive material at the point of operation.

2. In a stone sawing apparatus, an annular circular disk, a central hub and supporting shaft, said disk having alternate radial grooves and depressions with parallel sides, said grooves and depressions extending from the hub to the periphery and having a substantially equal depth.

3. In a granite and stone saw, a disk having radial corrugations of varying width upon both sides, said corrugations being of uniform depth throughout their lengths.

In testimony whereof we have hereunto set our hands in the presence of two subscribing witnesses.

GUSTAV GRIESCHE.
ANTHONY BECK.

Witnesses:
IRVINE SINNETT,
W. W. HEALEY.